(12) United States Patent
Bachmaier et al.

(10) Patent No.: US 10,787,082 B2
(45) Date of Patent: Sep. 29, 2020

(54) WHEEL SUSPENSION OF AN ELECTRICAL DRIVE FOR SUPPORTING A MANUAL MOVEMENT IMPULSE

(71) Applicants: Georg Bachmaier, München (DE); Marco Cyriacks, München (DE); Jens Fehre, Hausen (DE); Andreas Limmer, Fürth (DE); Wolfgang Zöls, München-Lochhausen (DE)

(72) Inventors: Georg Bachmaier, München (DE); Marco Cyriacks, München (DE); Jens Fehre, Hausen (DE); Andreas Limmer, Fürth (DE); Wolfgang Zöls, München-Lochhausen (DE)

(73) Assignee: Siemens Healthcare GmbH, Erlangen (DE)

( * ) Notice: Subject to any disclaimer, the term of this patent is extended or adjusted under 35 U.S.C. 154(b) by 254 days.

(21) Appl. No.: 15/764,168

(22) PCT Filed: Sep. 29, 2016

(86) PCT No.: PCT/EP2016/073250
§ 371 (c)(1),
(2) Date: Mar. 28, 2018

(87) PCT Pub. No.: WO2017/055445
PCT Pub. Date: Apr. 6, 2017

(65) Prior Publication Data
US 2018/0281604 A1    Oct. 4, 2018

(30) Foreign Application Priority Data

Sep. 30, 2015 (DE) .......... 10 2015 218 950

(51) Int. Cl.
*B60G 3/02* (2006.01)
*B60L 11/00* (2006.01)
(Continued)

(52) U.S. Cl.
CPC .............. *B60L 11/007* (2013.01); *B60G 3/02* (2013.01); *B60K 7/0007* (2013.01);
(Continued)

(58) Field of Classification Search
CPC .... B60L 3/0007; B60L 50/20; B60L 2200/30; B60L 2240/12; B60L 2240/16;
(Continued)

(56) References Cited

U.S. PATENT DOCUMENTS 4,697,661 A   10/1987 Pajerski et al.
5,746,282 A * 5/1998 Fujiwara ............... B60K 26/02
                                                 180/6.2

(Continued)

FOREIGN PATENT DOCUMENTS

DE    3784794 12      10/1993
DE    4237013 A1       5/1994
(Continued)

OTHER PUBLICATIONS

PCT International Search Report and Written Opinion of the International Searching Authority dated Jan. 20, 2017, for corresponding PCT/EP2016/073250.
(Continued)

*Primary Examiner* — Steve Clemmons
(74) *Attorney, Agent, or Firm* — Lempia Summerfield Katz LLC

(57) ABSTRACT

The disclosure relates to a wheel suspension of a device having an electrical drive of a wheel for supporting a manual movement impulse. The wheel suspension includes a connector piece movably or bendably arranged between a support element or support frame connected to the device and between an interior stator of an electrical drive, wherein the connector piece is held in a starting position due to the gravity of the device, without other influencing forces. The (Continued)

wheel suspension also includes at least one sensor that detects a deflection of the connector piece, and a control device designed such that the control device together with the electrical drive counteracts a deflection or bending of the connector piece.

19 Claims, 6 Drawing Sheets

(51) Int. Cl.
    *B60L 3/00*        (2019.01)
    *B60L 50/20*      (2019.01)
    *B60K 7/00*       (2006.01)
    *H02K 11/21*     (2016.01)
    *B60B 19/00*     (2006.01)
    *H02K 1/27*      (2006.01)
    *H02K 7/14*      (2006.01)

(52) U.S. Cl.
    CPC ............ *B60L 3/0007* (2013.01); *B60L 50/20* (2019.02); *B60B 19/003* (2013.01); *B60G 2200/10* (2013.01); *B60G 2200/422* (2013.01); *B60G 2300/26* (2013.01); *B60G 2300/50* (2013.01); *B60K 2007/0061* (2013.01); *B60L 2200/30* (2013.01); *H02K 1/2786* (2013.01); *H02K 7/14* (2013.01); *H02K 11/21* (2016.01)

(58) Field of Classification Search
    CPC ............ B60L 2240/20; B60L 2260/42; B60K 7/0007; B60K 2007/0061; B60K 26/02; B60K 28/14; B60G 3/02; B60G 2200/422; B60G 2300/26; B60G 2300/50; A61B 6/4405
See application file for complete search history.

(56) References Cited

U.S. PATENT DOCUMENTS

| | | | |
|---|---|---|---|
| 7,090,040 B2* | 8/2006 | Kamen | A61G 5/046 180/7.1 |
| 7,174,976 B2* | 2/2007 | Kamen | A63C 17/01 180/19.1 |
| 7,210,544 B2* | 5/2007 | Kamen | B60G 17/019 180/7.1 |
| 8,219,308 B2* | 7/2012 | Leeser | B62D 11/04 701/124 |
| 8,249,773 B2* | 8/2012 | Kawada | A61G 5/043 701/36 |
| 8,672,081 B2* | 3/2014 | Kume | B62B 5/0026 180/19.1 |
| 9,101,348 B2* | 8/2015 | Griffiths | B25J 5/007 |
| 9,714,046 B2* | 7/2017 | Strothmann | B62B 5/0069 |
| 9,827,843 B2* | 11/2017 | Block | B60K 7/0007 |
| 10,232,871 B2* | 3/2019 | Hane | A61H 3/04 |
| 2007/0041817 A1* | 2/2007 | Kakinuma | B62B 5/0026 414/490 |
| 2012/0123647 A1* | 5/2012 | Doi | B60L 15/20 701/49 |
| 2014/0103783 A1 | 4/2014 | Vogler et al. | |
| 2014/0251704 A1 | 9/2014 | Sekine et al. | |

FOREIGN PATENT DOCUMENTS

| | | |
|---|---|---|
| DE | 10111800 A1 | 10/2002 |
| DE | 102011078807 A1 | 1/2013 |

OTHER PUBLICATIONS

German Office Action for related German Application No. DE102015218950.3, dated Jun. 7, 2016.

* cited by examiner

WHEEL SUSPENSION OF AN ELECTRICAL DRIVE FOR SUPPORTING A MANUAL MOVEMENT IMPULSE

The present patent document is a § 371 nationalization of PCT Application Serial Number PCT/EP2016/073250, filed Sep. 29, 2016, designating the United States, which is hereby incorporated by reference, and this patent document also claims the benefit of DE 10 2015 218 950.3, filed Sep. 30, 2015, which is also hereby incorporated by reference.

TECHNICAL FIELD

The disclosure relates to a wheel suspension, in particular for a device having an electrical drive of a wheel for supporting a manual movement impulse, in particular for a mobile medical device such as, for example, a mobile C-arm system.

BACKGROUND

Wheel suspensions for electrically driven devices in which the electrical drive is incorporated in the wheel are generally known.

In principle, a relatively high degree of force may be required to set some devices or mechanisms in motion with their degrees of freedom. This applies, in particular, if there is a high coefficient of friction or high gravity. For this purpose, it is generally known to employ special control electronics with which an electrical drive of the respective device is controlled. However, this requires an in-depth knowledge of the control electronics by the operating personnel whereas it is easier to have the direct power assistance of the shear force which a machine operator applies to a device for the continued movement thereof. The problem here, however, is to quantitatively detect and implement the effect of the external force of the machine operator.

In addition, above all in the case of mobile devices with a high mass or speed, it is necessary to detect collision with objects or persons in order to minimize the damage to the mechanism and its surroundings as corresponding speed heavy devices are moved with a high degree of kinetic energy. Simple controls in which only the influencing shear force is converted initially also produce an amplification of the collision incident in the event of a collision due to the natural influence of the machine operator, which may be amplified by the collision as it follows the inertia of the mass. If this is to be prevented, it is necessary for the known systems to incorporate an additional and expensive sensor system to register an existing collision and to take corresponding countermeasures and/or at least end the forward thrust.

A drive system is known from German Patent Publication No. DE 10 2011 078 807 A1, in particular, for an electric and/or hybrid vehicle including a standing part and a rotatably mounted part and an electric motor with a stator and a rotor, wherein the standing part includes the stator and the rotatably mounted part the rotor. To detect a tilting of the bearing and/or the rotor, in particular, to prevent grinding of the rotor on the stator and/or to detect damage in the system, the drive system includes a bearing tilt detection system for detecting a bearing tilt of the rotatably mounted part, wherein the bearing tilt detection system evaluates data from the electric motor and/or at least one sensor.

German Patent Publication No. DE 101 11 800 A1 describes another mobile medical device with wheels, an electromechanical parking brake being arranged on at least one wheel.

Finally, German Patent Publication No. DE 42 37 013 A1 discloses another generic motor-adjustable X-ray machine.

SUMMARY AND DESCRIPTION

The scope of the present disclosure is defined solely by the appended claims and is not affected to any degree by the statements within this summary. The present embodiments may obviate one or more of the drawbacks or limitations in the related art.

It is an object of the disclosure to provide a wheel suspension for electrically driven wheels of a mobile device and/or a device wherein the wheel suspension, on the one hand, permits a shear-dependent amplification of force of a machine operator and, on the other hand, also develops an at least collision-damping effect.

With the aid of a stable pendulum incorporated in the wheel suspension of a mobile device, it is possible to be able to measure and support the effect of external force. As disclosed herein, a stable pendulum is understood to refer to a pendulum which, due to its suspension and mounting, is adjusted to a stable starting position by the gravity of the device and without the influence of an external shear force and deflected from this starting position or at least subjected to a tension with the influence of a shear force on the device. In the sense of the disclosure, however, a tension is also understood—in the sense of a tightening—as a deflection, as any tension also requires at least minimal deflection.

If the pendulum is incorporated in the wheel suspension such that the pendulum constitutes a connection between the wheel axle of the electrical drive and a suspension point located beneath the wheel axle which is connected to the device itself in a stable manner, the gravity of the device forces the adjustment of a neutral starting position without the effects of other forces. However, as soon as a shear force influences the device, a deflection of this pendulum takes place, which may be detected. If a sensor which detects such a deflection is connected to a control of the electric wheel drive, this deflection may be automatically counteracted by way of a corresponding control circuit such that support of the influencing shear force is brought about.

In the event of a collision of the mobile device with an object, an opposing shear force arises which by way of the same mechanism results in the electrical drive counteracting such a collision and at least one collision-absorbing effect developing.

In accordance with this basic principle, a wheel suspension of a device is provided, wherein the wheel suspension includes an electrical drive of a wheel for supporting a manual movement impulse. The wheel suspension includes a connector piece that is bendably fastened to a support element connected to the device, wherein the support element supports at least part of the weight of the device, wherein the electrical drive has at least one electric motor with an interior stator and an exterior rotor, and wherein the stator is firmly connected to the connector piece and the connector piece automatically assumes a starting position due to the downward acting gravity of the device in the absence of a shear force acting perpendicularly to gravity. The wheel suspension also includes control electronics designed such that together with the electrical drive they counteract a deflection or bending of the connector piece.

In principle, with this wheel suspension, both the deflection and the bending of the connector piece may be detected and measured in any direction that differs from the direction of gravity. The measurement may be performed within a plane perpendicular to gravity.

Furthermore, it is advantageous if the electrical drive has an electric hub motor as a highly compact drive unit incorporated in the wheel suspension may be created with this embodiment.

In an embodiment, the wheel suspension may be designed such that the deflection and/or bending of the connector piece is measured in at least two planes independent of each other perpendicular to gravity.

In a further embodiment of the wheel suspension, at least one strain gage or one position sensor may be attached to measure the bending of the connector piece for each deflection direction to be detected, wherein at least one strain gage may be used in connection with a tension measurement and the position sensor in connection with a pivotably mounted connector piece as a pendulum.

Furthermore, the wheel suspension may be designed such that the electrical drive is designed as an electrically driven omni wheel with variable drive direction in one plane. As such an electrical drive may be controlled in any direction without the wheel suspension itself having to be rotatable, such an embodiment is suitable, in particular, for variants of the wheel suspension in which the deflection of the connector piece is not restricted to one deflection direction and accordingly, not only the size of the deflection but also its direction is determined by using a plurality of sensors. Accordingly, for compensation of the deflection and thus for movement support, the direction of travel of the respective drive may take place in the respective present direction of thrust.

In a variant which may be produced in a particularly simple and cost-effective manner of the wheel suspension of a device having an electrical drive of a wheel for supporting a manual movement impulse, the wheel suspension includes a floating axle mounted in a pivotable manner on a support element fastened to the device, wherein the support element supports at least part of the weight of the device. The wheel suspension also includes a pendulum arm and a motor axle, wherein the motor axle is firmly connected to the floating axle by way of the pendulum arm, and wherein the floating axle is arranged below the motor axle such that the pendulum arm automatically assumes an undeflected starting position due to the downward acting gravity of the device in the absence of a shear force acting perpendicularly to gravity and perpendicularly to the floating axle. The wheel suspension also includes an electrical drive connected to the motor axle, and control electronics designed such that together with the wheel driven by the electrical drive they counteract a deflection of the pendulum arm.

Such an embodiment is in principle limited to one direction with regard to the direction of movement in the wheel suspension and the drive, wherein as a result the corresponding sensor system is also reduced to the use of a single position sensor and may therefore also be produced very cost-effectively. "Direction" refers to both positive and negative values of a motion vector, in other words, both forwards as well as backwards, along a vector, and if applicable, along a circular path around a pivot.

Advantageously, the floating axle and the motor axle are aligned parallel to each other. Furthermore, the electrical drive may drive a wheel which serves to move the device. In this context, one embodiment relates to a wheel suspension of a device that moves on largely flat ground. The wheel may be rail-guided and/or suspended in a guide, e.g., a cable guide.

Furthermore, the electrical drive may have a stator and a rotor, wherein these may be designed such that the stator is firmly connected to the pendulum arm, wherein electromagnets may be arranged in the stator and permanent magnets in the rotor. Furthermore, the rotor may be circumferentially surrounded by an impeller.

For detection of the deflection of the pendulum arm, a sensor may be arranged such that it detects and forwards the deflection of the pendulum arm to the control electronics of the electrical drive. Such control electronics may have a control circuit which controls and/or regulates the wheel speed as an output variable due to the deflection as a correcting variable.

Such a sensor may be designed as an angle sensor or as a position sensor, if applicable a proximity sensor may also be used which, depending on the shear load of the wheel suspension, the pendulum approaches or moves away from.

In a variant, the wheel suspension may be arranged on a device which is a mobile medical device, in particular, a mobile C-arm or a medical operating unit.

In addition to the wheel suspension itself, a device with at least one wheel suspension is also proposed, e.g., two wheel suspensions and at least one free-running wheel, wherein at least one free-running wheel may adjust itself as desired with regard to its direction of travel. If more than one wheel suspension is provided with one electrically driven wheel in each case, it may also be favorable to control the electrical drives by way of a common control and/or regulation device as well as to process the sensor data coming from the sensors in such a common control and/or regulation device.

Accordingly, in a variant of the device the support element of at least one wheel suspension may be pivotably mounted around a vertical pivot axis. Furthermore, the support element of at least one wheel suspension may be immovably mounted on a housing and/or chassis so as to be pivotable in a fixed manner around a vertical pivot axis.

BRIEF DESCRIPTION OF THE DRAWINGS

The disclosure is explained in more detail hereinafter with reference to the exemplary embodiments with the aid of the figures.

DETAILED DESCRIPTION

Figure 1:
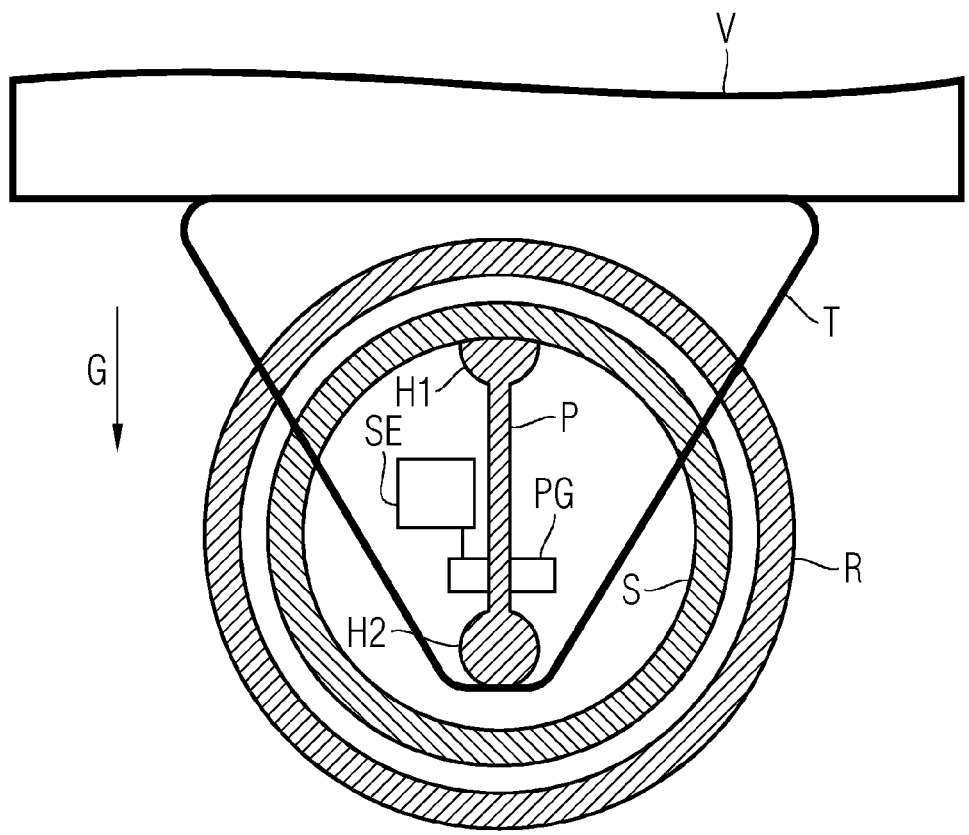
FIG. 1 depicts a basic principle of the disclosure.

FIG. 1 shows a diagrammatic view of a basic principle of the present disclosure. This shows an electrically driven wheel including a rotor R and a stator S stored therein. The bearing and the electrical components are not shown in order to provide a better overview. The stator S is connected by way of a first stopping point H1 (corresponding to a first force effect point) to the connector piece P. Furthermore, the connector piece P is connected by way of a second stopping point H2 (corresponding to a second force effect point) by way of a support frame T to a device V such that gravity is transmitted by way of the connector piece P to the wheel. The second stopping point H2 of the connector piece P is arranged below the first stopping point H1 with regard to gravity G. The stopping points H1, H2 may be designed in the form of fixed connections or flexible bearings, for example, an axial bearing or a ball joint. The connector piece P may be designed in a correspondingly flexible or rigid manner and fulfill the function of a more or less rigid pendulum fastened on one side and connected to a large mass on the other side. It may be designed such that laterally occurring forces generate a deflection of the connector piece or a corresponding bending or at least tension which may be detected.

If only the gravity G of the device acts on this connector piece, the connector piece P is located—as shown—in a neutral starting position. If horizontal shear forces take effect, these bring about a deflection of the connector piece P which may be detected by corresponding sensors. With the aid of a control circuit with the deflection as an input value and an output value which controls the electrical drive of the wheel, the arising shear forces may possibly also be supported while detecting the direction of the shear forces and while aligning the drive direction such that simple pushing of the device by a machine operator is supported in a reinforcing manner Conversely, a braking intervention on the device also brings about a deflection of the connector piece P such that in the case of a continuous movement of the device and braking influence by the machine operator, braking may either be actively triggered or the electrical drive may be switched to a generator mode which brings about power-assisted braking.

In addition, control electronics SE incorporated in the wheel drive are shown diagrammatically which receive the deflection information of the connector piece P from a sensor, here in the form of a position sensor PG, and transfer it to the control electronics of the wheel. As an alternative to one or more position sensors, for example, strain gages may also be used, wherein not only the amount but also the direction of a tension of the connector piece may already be detected with the aid of at least three strain gages.

Figure 2:
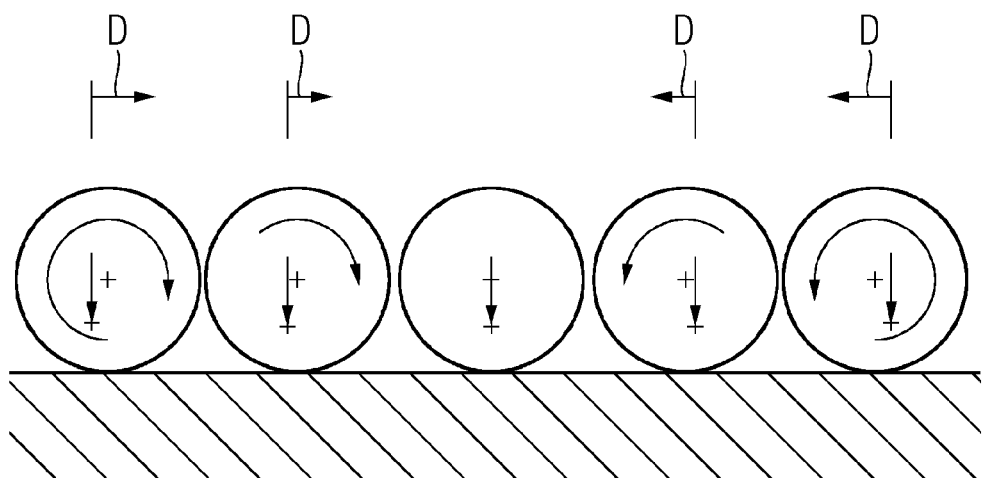
FIG. 2 depicts a schematic diagram of the effects of force on the wheel suspension according to an example.

To clarify the effect, FIG. 2 shows a schematic diagram of the forces on the wheel suspension. The neutral situation is shown in the center, in which only gravity G influences the system. Accordingly, the force effect points H1 and H2, which are marked as crosses here, are shown vertically above one another. The lateral representations thereof in each case show how the system behaves when a pressure D and/or such a shear force is exerted on the system. In this case, the different length of the vectors D corresponds to their size and the length of the rotation vectors to the electric propulsion force which is generated correspondingly by the control.

Figure 3:
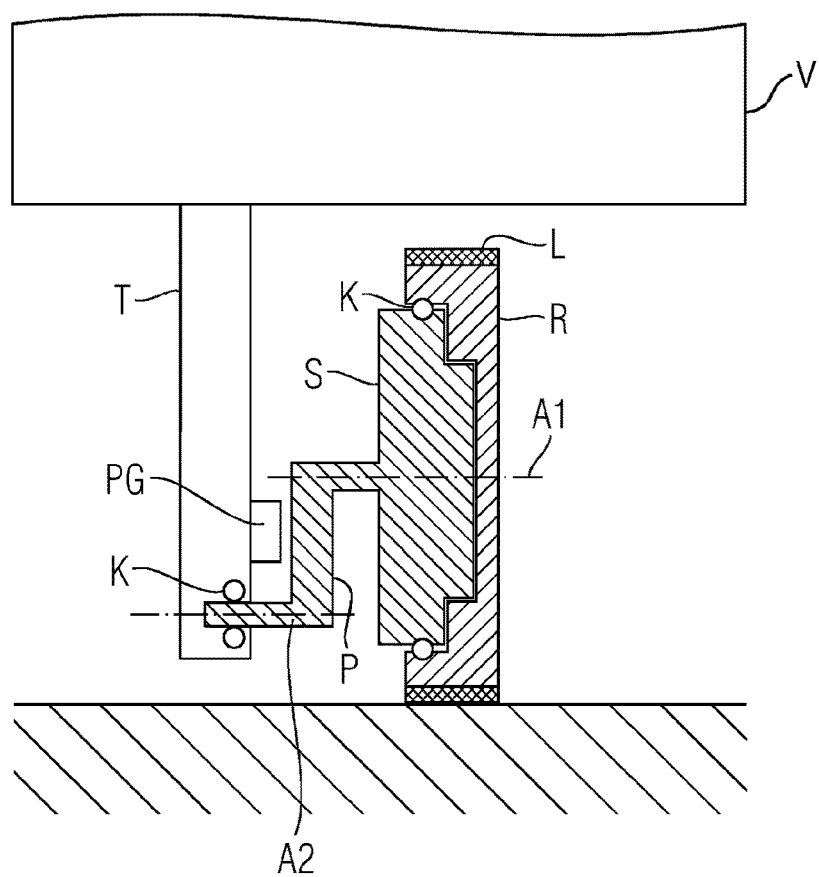
FIG. 3 depicts a vertical section in the plane of the axles through a wheel suspension according to an example with a pivotably mounted connector piece/pendulum.
Figure 4:
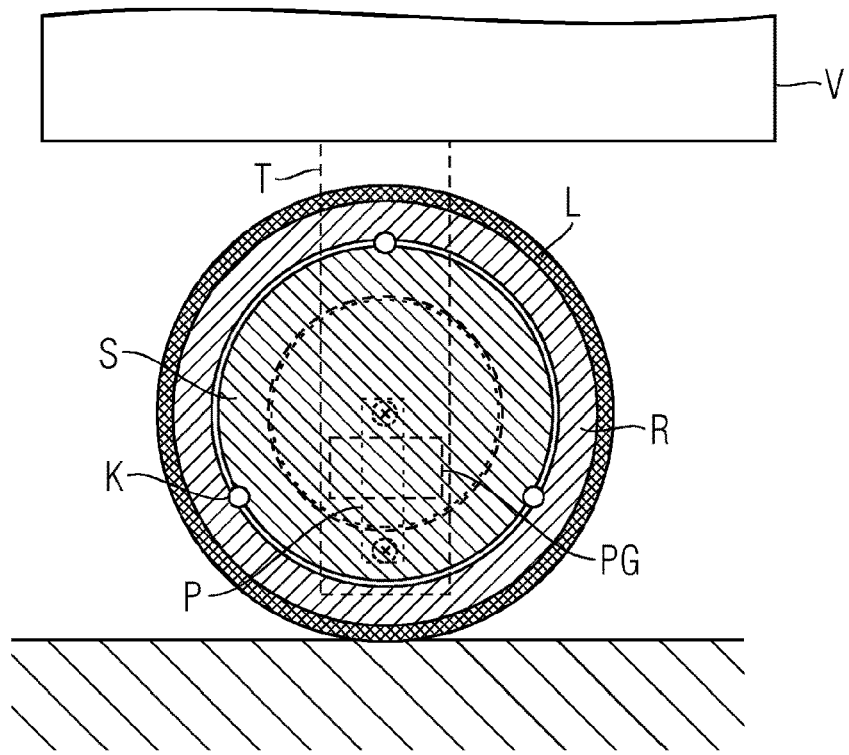
FIG. 4 depicts a vertical section perpendicular to the plane of the axles through the wheel suspension according to the example from FIG. 3.

FIGS. 3 and 4 show a variant of a wheel suspension in a vertical section in the plane of the axles A1 and A2 and perpendicular thereto with a pivotably mounted connector piece/pendulum P. In this variant, the support frame T is firmly connected to the device V and/or its chassis. In the lower area of the support frame T, there is a bearing for a floating axle A2 which is connected to the lower end of the connector piece V. The electrically driven rotor R is mounted on the stator S so as to be rotatable about the motor axle A1 by balls K or in some other way. The connector piece V is connected to the axles A1 and A2 in such a way that the motor axle A1 and the floating axle A2 are oriented parallel to one another, wherein the motor axle A1 is arranged above the floating axle A2. In addition, in order to provide better adhesion to the substrate, a rubberized tread L is also located on the circumferential side of the rotor R.

Due to the use and arrangement of the axles A1 and A2, this wheel suspension is designed to reinforce only the shear forces which have a force component perpendicular to the plane spanned by the axles A1 and A2. Forces acting in this plane do not generate any deflection of the connector piece P.

A position sensor PG is attached to detect the deflection of the connector piece P or another part firmly connected thereto and forwards its information to a control circuit to control the electrical drive. The electrical components of the electrical drive are not shown explicitly. In this regard, reference is made to electric hub motors and hub generators that are also used, for example, in the field of electric bicycles.

Figure 5:
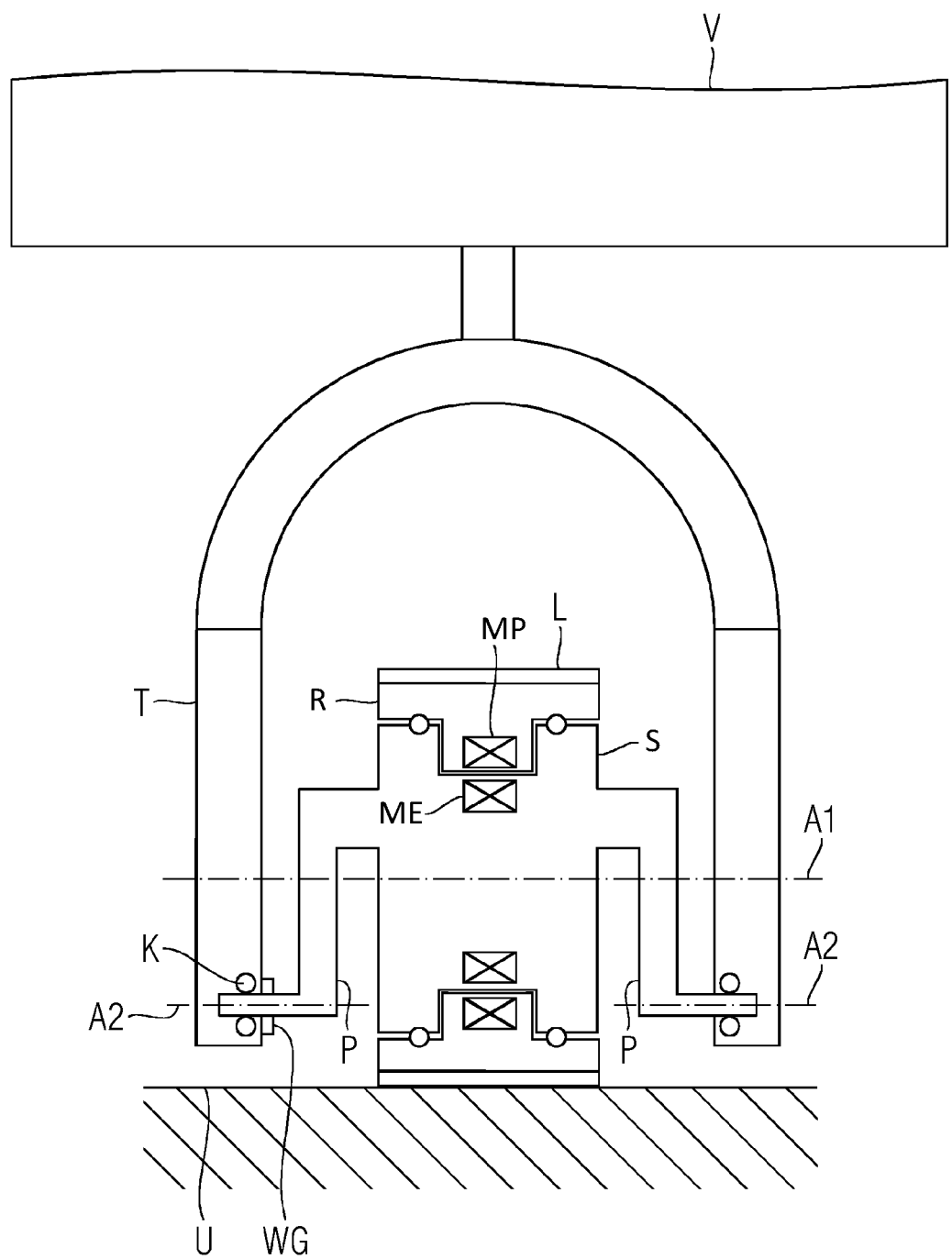
FIG. 5 depicts a vertical section in the plane of the axles through a further wheel suspension according to an example with two pivotably mounted connector pieces/pendulums.

An alternative similar embodiment of a wheel suspension is shown in FIG. 5. Here, a vertical section may be seen in the plane spanned by the floating axle A2 and the motor axle A1 with two pivotably mounted connector pieces P, which is structurally more stable. The support frame T is fastened to the device V and/or its housing and in the lower part has a bearing for the two coaxially arranged floating axles A2. The illustrated balls K are only intended to represent a pivotable bearing symbolically, wherein other roller bearings or plain bearings or other systems may also be used here and in the bearings shown in the other embodiments.

The two floating axles A2 are each firmly connected to a connector piece P, which acts as a pendulum and extends upwards where the connector piece P is connected to the stator S of the electrically driven wheel. It is pointed out that the shape of the connector piece P shown here is only intended to illustrate the connection, which is in principle fixed, between the stator S and the floating axle. In principle, the location of the connection and the shape of the connection between the floating axle A2 and the stator S is discretionary as long as it is rigid and each movement of the floating axle A2 is transferred to the stator S. The motor axle A1 is arranged above the floating axle A1. For example, the connector piece P may be "incorporated" in the stator itself without any change to the basic principle of the wheel suspension.

The rotor R is mounted around the stator S, wherein a plurality of permanent magnets MP are arranged in the rotor R and a plurality of electromagnets ME are arranged in the stator S which produce the electric drive. On the circumference, the rotor R is also surrounded by a running surface L which, for example, may include rubber or plastic and provides an improved adhesion of the wheel on the substrate U.

The deflection of the connector piece P due to an impacting shear force with a horizontal component perpendicular to the floating axle P is detected here in an exemplary manner by an angle sensor WG arranged in the area of the bearing of the floating axle P which, without this being shown explicitly, is connected to the control electronics which control the electrical drive (in operation with the aid of the processor with a storage device in the control electronics and corresponding program code there) in a manner.

Figure 6:
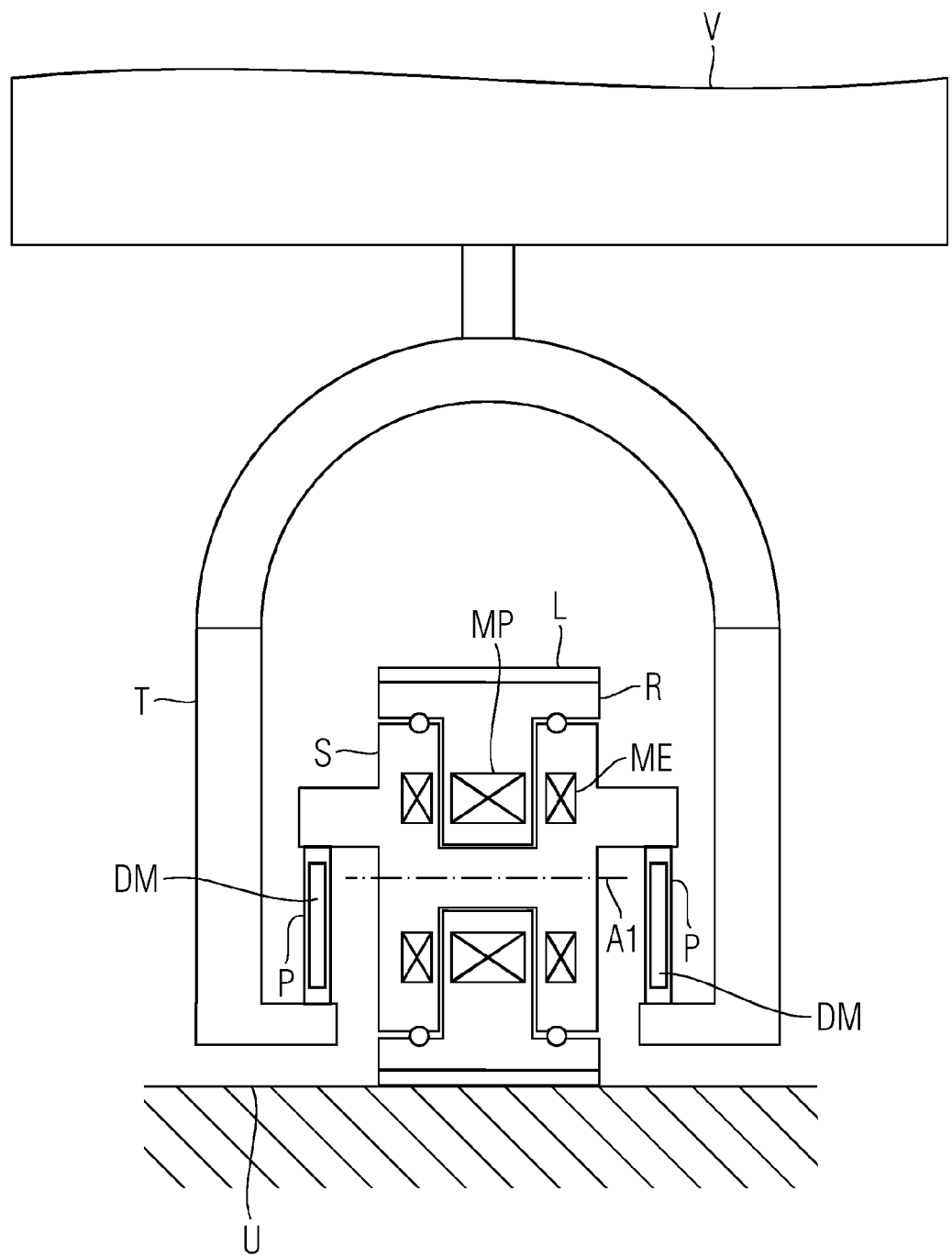
FIG. 6 depicts a vertical section in the plane of the axles through a further wheel suspension according to an example with two rigidly connected connector pieces/pendulums.

While the embodiments of the wheel suspensions shown in FIGS. 3 to 5 have pivotably mounted connector pieces P, FIG. 6 shows an embodiment in which the two connector pieces P between the stator S of the electrically driven wheel shown here have a largely rigid connection to the support frame T. The necessary flexibility is achieved here by a non-rigid but resiliently flexible embodiment of the connector piece P. In the case of a relatively soft embodiment of the connector piece P, in turn a position sensor may be used to detect the deflection. However, if the connector pieces P are harder, such that the arising deflections may only be determined in a costly manner, it may be advantageous to detect the tension (=voltage) and/or the bending of the connector piece P by strain gages DM attached thereto.

Figure 7:
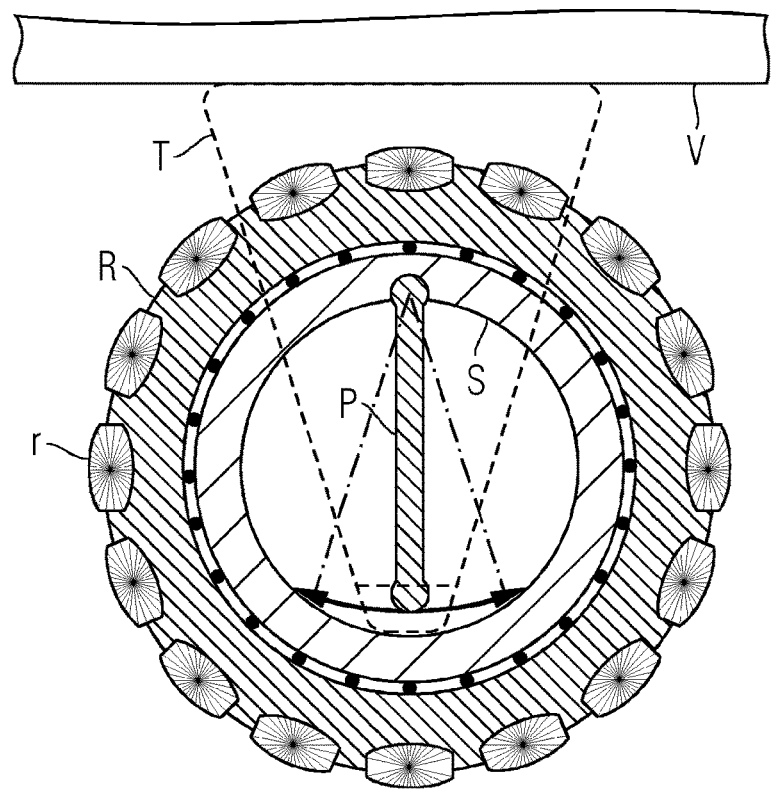
FIG. 7 depicts a vertical section in the rotational plane of the main wheel through a wheel suspension according to an example with a pivotably mounted connector piece and omni wheel-drive.
Figure 8:
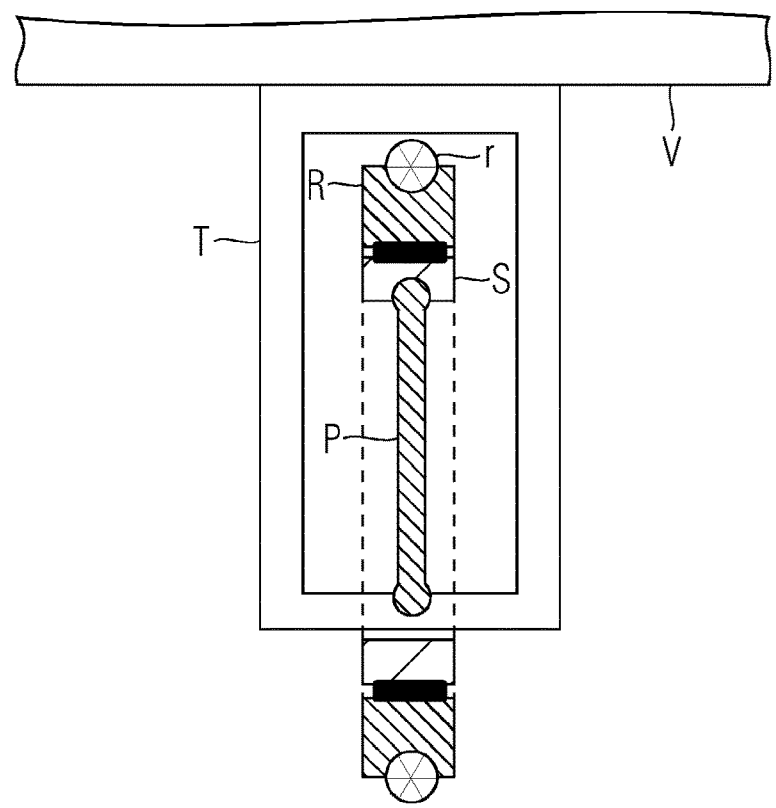
FIG. 8 depicts a vertical section perpendicular to the rotational plane through the wheel suspension according to the example from FIG. 7.

Another embodiment of a wheel suspension is shown in FIGS. 7 and 8 in the vertical section in the rotational plane of the main wheel on the one the hand, and perpendicular to the rotational plane on the other hand. While the systems shown in FIGS. 3 to 6 only have one degree of freedom with regard to the deflection direction, in other words, may only be deflected in one direction forwards and/or backwards and accordingly also only have one simple wheel which (without slippage) may only be moved along a straight line, a system is shown here in FIGS. 7 and 8 wherein both the shear detection as well as the movement is aligned in any horizontal direction.

Here the wheel is designed as a so-called omni wheel embodied as a hub drive with an interior stator S and an electrically driven large rotor R revolving around it. In addition, on the circumference of the large rotor R, a plurality of small rotors r is arranged, whose rotation axes are each oriented tangentially to the circumferential direction of the large rotor R. The small rotors r are likewise electrically driven, the large rotor R may therefore display the stator for the small rotors in each case. Alternatively, however, the axles of the small rotors r may also be driven in another manner, for example, by way of a central electric motor in the large rotor R. In this way, the wheel of this embodiment may be controlled in any direction by the interaction of the movement of the large rotor R and the small rotors r.

Accordingly, the connector piece P between the stator S and the support frame T is also mounted such that it may be deflected in any horizontal directions. In the illustration shown, this is realized by the two ball joints arranged at the end of the connector piece P. It is pointed out, however, that it is sufficient in principle if one of the two ends is mounted by way of a ball joint and the respective other end has a fixed connection. The relative deflections caused by an external shear between the connector piece P and the support frame T and/or between the connector piece P and the stator S is detected according to the direction and may then also be supported according to the direction with the aid of a control unit by way of the electrical drive of the omni wheel.

Figure 9:
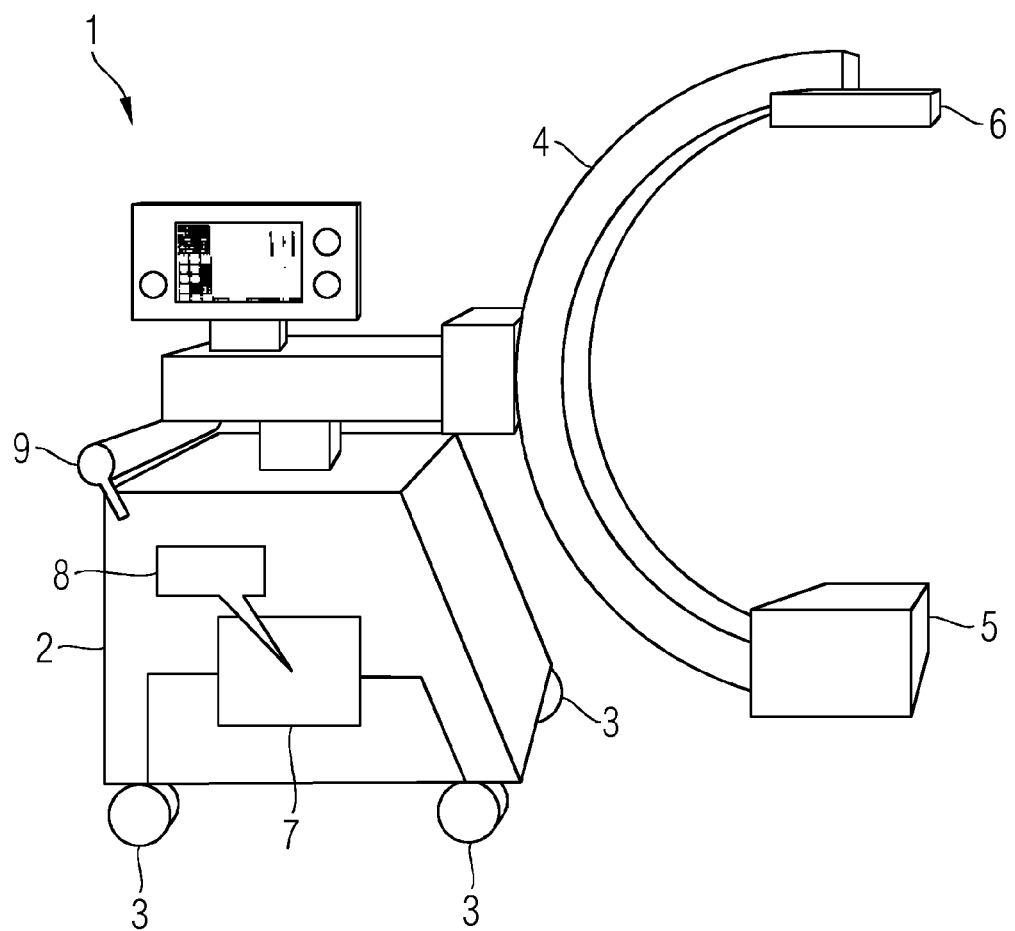
FIG. 9 depicts a mobile C-arm system with wheel suspensions according to an example.

In addition to the wheel suspension, a device equipped therewith is also proposed in the present document. A mobile medical device, or rather a mobile C-arm system with wheel suspensions represents such a device in FIG. 9. The mobile C-arm system 1 has a housing 2 on which a total of four wheels 3 are arranged, which provide the mobility of the system. At least two of these wheels 3 are designed with a force-assisted wheel suspension, for example, according to one of the variants previously shown. The C-arm system itself is equipped with a C-arm 4, on which an X-ray tube 5 and a flat X-ray detector 6 is fastened. In the housing, there is also a calculation and control unit 7 which has a storage device 8 in which the program code, which is executed in operation, is stored. This calculation and control unit 7 may also be connected to the sensors located in the wheel suspension and detect shear forces which, for example, are exerted on a handle 9 on the C-arm system 1 and accordingly control the electrical drive in the wheel suspensions with the help of stored program code such that the shear forces applied by an operator to continue moving the C-arm system are supported and/or if shear forces arise due to a collision, these are mitigated.

A major advantage of the embodiments of the disclosure is therefore also to be found in the collision protection contained therein. When the pendulum shaft or the mass acting thereon strikes an obstacle, the pendulum is deflected and thus allows compliance. As a result of the deflection of the connecting piece, the collision is detected, whereby the motor may apply and actively brake an opposite torque. As a result, the collision energy may be drastically reduced or even prevented.

Another advantage of the embodiments of the disclosure is also to be found in the costs of the sensor principle. Hall sensors, which are widely used in the automobile industry and are very favorable for this reason, are excellent for the detection of deflection.

Furthermore, power assistance with the aid of the pendulum concept described here has the advantage of no particular buttons, joysticks, or components on the device needing to be operated in order to measure the external force and to obtain power assistance from the motor. Above all, it is advantageous for the operator of the device as no instruction is required due to everything being identical to previous operation. As the movement may only be detected by the connector piece acting as a pendulum, there is no need for any sensor system or haptics on the operating elements and the operating elements themselves. This enables the operator to operate the device from any location, without explicitly having to activate a switch or operating element. The degrees of freedom for operating the system are significantly increased as a result.

It is also advantageous that a reduction of the sensors for force detection on the system is achieved and at the same time a reduction of the cabling expense and thus of interfaces and control and regulation technology.

By way of the wheel suspension, the user may trigger braking by applying a counterforce in an already moving device and thus realize a quasi-speed control in the drive.

The use of the wheel suspension is possible in many different areas but above all where an interaction between man and machine is required.

A further advantage of the embodiments of the disclosure is that devices which hitherto may only be moved by a motor by manual controls, may in future also continue to be moved manually with motor-driven support. This is of particular interest for the topic "man-machine and/or man-robot cooperation".

Overall, a wheel suspension of a mobile device having an electrical drive of a wheel for supporting a manual movement impulse is therefore proposed, wherein a connector piece is movably or bendably arranged between a support element or support frame connected to the device and between an interior stator of an electrical drive, such that the connector piece is held in a starting position due to the gravity of the device, without other influencing forces. Furthermore, at least one sensor, (for example, a strain gage, a proximity sensor, a position sensor or an angle sensor), is attached that detects a deflection of the connector piece, and control electronics are provided, (for example, in the form of programmable control electronics with a processor, storage device, and corresponding program code executed in operation), which are designed such that the control device together with the electrical drive counteracts a deflection or bending of the connector piece.

Although the disclosure has been illustrated and described in detail by the exemplary embodiments, the disclosure is not restricted by the disclosed examples and the person skilled in the art may derive other variations from this without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A wheel suspension of a device, the wheel suspension comprising:
a connector piece bendably fastened to a support element connected to the device, wherein the support element is configured to support at least part of a weight of the device;
an electrical drive of a wheel, wherein the electrical drive is configured to support a manual movement impulse, and wherein the electrical drive has at least one electric motor with an interior stator and an exterior rotor, wherein the stator is attached to the connector piece and the connector piece is configured to automatically assume a starting position due to a downward acting gravity of the device in an absence of a shear force acting perpendicularly to the gravity; and
control electronics configured such that, together with the electrical drive, the control electronics and electrical drive counteract a deflection or bending of the connector piece.

2. The wheel suspension of claim 1, wherein the deflection, the bending, or the deflection and the bending of the connector piece are measured in a plane perpendicular to the gravity.

3. The wheel suspension of claim 1, wherein the electrical drive has an electric hub motor.

4. The wheel suspension of claim 1, wherein the deflection, the bending, or the deflection and the bending of the connector piece is measured in at least two independent planes perpendicular to the gravity.

5. The wheel suspension of claim 1, wherein a strain gage or a position sensor is attached to the connector piece to measure the bending or deflection of the connector piece for each deflection direction to be detected.

6. The wheel suspension of claim 5, wherein the electrical drive is configured as an electrically driven omni wheel having a variable drive direction in one plane.

7. A wheel suspension of a device, the wheel suspension comprising:
a floating axle mounted pivotably on a support element, which is fastened to the device, wherein the support element is configured to support at least part of a weight of the device;
a pendulum arm;
a motor axle connected to the floating axle by way of the pendulum arm, wherein the floating axle is arranged below the motor axle such that the pendulum arm is configured to automatically assume an undeflected starting position due to a downward acting gravity of the device in an absence of a shear force acting perpendicularly to the gravity and perpendicularly to the floating axle;
an electrical drive of a wheel, wherein the electrical drive is configured to support a manual movement impulse, and wherein the electrical drive is connected to the motor axle; and
control electronics configured such that, together with the wheel driven by the electrical drive, the control electronics and the electrical drive counteract a deflection of the pendulum arm.

8. The wheel suspension of claim 7, wherein the floating axle and the motor axle are aligned parallel to one another.

9. The wheel suspension of claim 7, wherein the electrical drive drives the wheel that is configured to move the device.

10. The wheel suspension of claim 7, wherein the electrical drive has a stator and a rotor, wherein the stator is connected to the pendulum arm.

11. The wheel suspension of claim 10, wherein electromagnets are arranged in the stator and permanent magnets are arranged in the rotor.

12. The wheel suspension of claim 10, wherein the rotor is circumferentially surrounded by an impeller.

13. The wheel suspension of claim 7, further comprising:
a sensor configured to detect and forward a deflection of the pendulum arm to the control electronics of the electrical drive.

14. The wheel suspension of claim 13, wherein the sensor is an angle sensor.

15. The wheel suspension of claim 13, wherein the sensor is a position sensor.

16. A device comprising:
a wheel suspension having:
a connector piece bendably fastened to a support element connected to the device, wherein the support element is configured to support at least part of a weight of the device;
an electrical drive of a wheel, wherein the electrical drive is configured to support a manual movement impulse, and wherein the electrical drive has at least one electric motor with an interior stator and an exterior rotor, wherein the stator is attached to the connector piece and the connector piece is configured to automatically assume a starting position due to a downward acting gravity of the device in an absence of a shear force acting perpendicularly to the gravity; and
control electronics configured such that, together with the electrical drive, the control electronics and electrical drive counteract a deflection or bending of the connector piece.

17. The device of claim 16, wherein the device is a mobile medical device.

18. The device of claim 16, wherein the support element of the wheel suspension is pivotably designed around a pivot axis.

19. The device of claim 16, wherein the support element of the wheel suspension is immovably mounted on a housing, a chassis, or the housing and the chassis of the device so as to be pivotable in a fixed manner around a pivot axis.

\* \* \* \* \*